United States Patent
Brey et al.

(10) Patent No.: US 9,729,181 B2
(45) Date of Patent: Aug. 8, 2017

(54) NETWORK ACCESS DEVICE FACEPLATE

(71) Applicant: Continental Automotive Systems, Inc., Auburn Hills, MI (US)

(72) Inventors: Thomas Brey, Lake In The Hills, IL (US); James R Snider, Kildeer, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 2 days.

(21) Appl. No.: 14/565,008

(22) Filed: Dec. 9, 2014

(65) Prior Publication Data

US 2016/0164561 A1  Jun. 9, 2016

(51) Int. Cl.
*H04B 1/38* (2015.01)
*H04B 1/3822* (2015.01)
*H04L 29/08* (2006.01)
*H04B 1/3888* (2015.01)

(52) U.S. Cl.
CPC ......... *H04B 1/3822* (2013.01); *H04B 1/3888* (2013.01); *H04L 67/12* (2013.01); *B60K 2350/1028* (2013.01)

(58) Field of Classification Search
CPC ...... H04B 1/3822; G06F 3/0412; H04L 67/12
See application file for complete search history.

(56) References Cited

U.S. PATENT DOCUMENTS

| | | | |
|---|---|---|---|
| 2007/0171316 A1* | 7/2007 | Mathias | B60R 11/0211 348/837 |
| 2009/0228615 A1* | 9/2009 | Beckert | B60R 16/0315 710/21 |
| 2009/0303143 A1* | 12/2009 | Miyoshi | H01Q 5/378 343/728 |
| 2010/0073236 A1* | 3/2010 | Mierke | H01Q 21/28 343/700 MS |
| 2011/0257973 A1* | 10/2011 | Chutorash | G01C 21/3661 704/235 |
| 2014/0200765 A1* | 7/2014 | Waeller | H04L 12/282 701/36 |
| 2015/0253742 A1* | 9/2015 | Baba | G01S 19/24 368/14 |

* cited by examiner

*Primary Examiner* — Xin Jia

(57) ABSTRACT

The front side of a vehicle infotainment system head unit is provided with a removable faceplate that carries a network access device such as a cell phone or GPS receiver and an associated antenna. A removable user-interface display panel, also referred to herein as a display screen, is also carried by the faceplate. When the head unit and faceplate are assembled into a vehicle dashboard, a removable bezel conceals the network access device, antenna and provides access to the display panel. The network access device and its antenna are thus readily accessible by simply removing the bezel.

14 Claims, 4 Drawing Sheets

NETWORK ACCESS DEVICE FACEPLATE

BACKGROUND

Most motor vehicles are provided with electronic devices that are operated through a common or single user interface area located on the vehicle's dash board. Examples of such electronic devices include a radio receiver for commercial broadcast bands, a CD or DVD player, an MP-3 player, navigation system or a cell phone.

The ability to customize the type of devices that are provided and the functionality of them within a particular vehicle currently resides at the factory where the vehicle is assembled. Retrofitting, changing or repairing such entertainment systems typically requires the use of "aftermarket" components and/or bulky antennas that need to be mounted somewhere on the automobile.

Upgrading a factory installation to add, repair or change an electronic device requires extensive disassembly of at least the dashboard. An example of upgrading a factory-installed device would be replacing a "3G" data network access device with a "4G" data network device. An apparatus and method that can facilitate an after-sale upgrade or change to a factory-installed entertainment system would be an improvement over the prior art.

DETAILED DESCRIPTION

As used herein, the term, "head unit" refers to a component of a vehicle information/entertainment/system, (an "infotainment" system) that provides a unified connection interface for a faceplate, which in turn provides one or more user interfaces for the various components of the infotainment system. The head unit is typically located at or near the center of the vehicle's dashboard.

As used herein, the term "faceplate" refers to a circuit board, which is attached to the front side of a head unit and which supports one or more user interfaces by which a user controls the vehicle's infotainment system. Touch-sensitive display panels, also referred to herein as display screens, mechanical switches and potentiometers are examples of user interfaces that can be mounted to a faceplate and by which a person can control the operation of an infotainment device or system.

As used herein, the term "bezel" refers to a plastic decorative trim piece placed over and/or around a faceplate. A bezel conceals unsightly connections and thus provides an aesthetic blending of an infotainment faceplate and controls with a vehicle's dashboard.

A "network access device" or "NAD" is a radio frequency transceiver configured to provide two-way radio frequency communications between a vehicle and a communications network, such as a cellular telephone network. A GPS receiver, however, is also considered herein to be a network access device. The type of modulation used by a radio frequency transceiver is a matter of choice that depends on the modulation schemes used by wireless communication networks available in the areas in which the device is operated.

A "dashboard" is a panel extending across the interior of a vehicle and located below the windshield. It usually contains instruments such as a speedometer and controls.

As used herein, the term, "removably attached" means that a device or component can be connected, attached or installed during initial manufacture but can also be removed, replaced or detached at a later time without causing operational, function damage, impairment or disfigurement. By way of example, an electronic component that is soldered into a circuit board is not considered to be "removably attached. An electronic component that is instead attached to the circuit board using a connector is "removably attached" to the circuit board.

Figure 1:
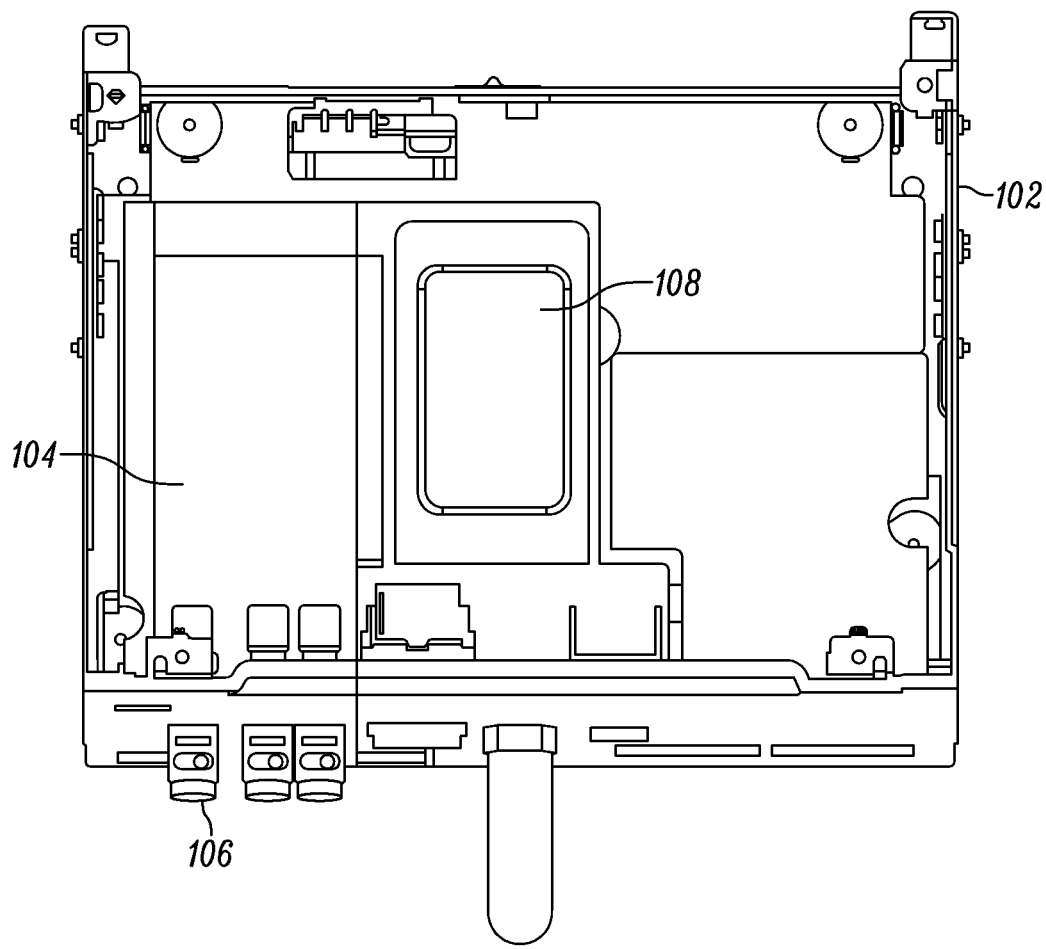
FIG. 1 is a top view of a prior art head unit of a vehicle entertainment system and showing where a network access device is located inside the head unit.

Referring now to the figures, FIG. 1 is a top view of a prior art head unit 100 of a vehicle infotainment system. The head unit 100 is essentially a box 102 constructed from sheet metal panels.

The metal box 102 encloses various electronic system components. Because it is metal, it also inhibits the transmission and reception of virtually all radio frequency signals by RF devices located inside the box 102, including in particular a two-way wireless network access device 104, shown in FIG. 1 inside the metal box 102. An external antenna (not shown) for the network access device 104 is thus required. An external antenna thus requires an antenna connector 106 by which an external antenna can be connected to the network access device 104.

The prior art head unit 100 shown in FIG. 1 is typically installed into a vehicle dashboard, not shown in FIG. 1 but well known. Locating a head unit 100 inside a dashboard makes a head unit 100 difficult to remove from the vehicle but it also makes an upgrade, replacement or service of a component inside the head unit 100 even more difficult.

Figure 2:
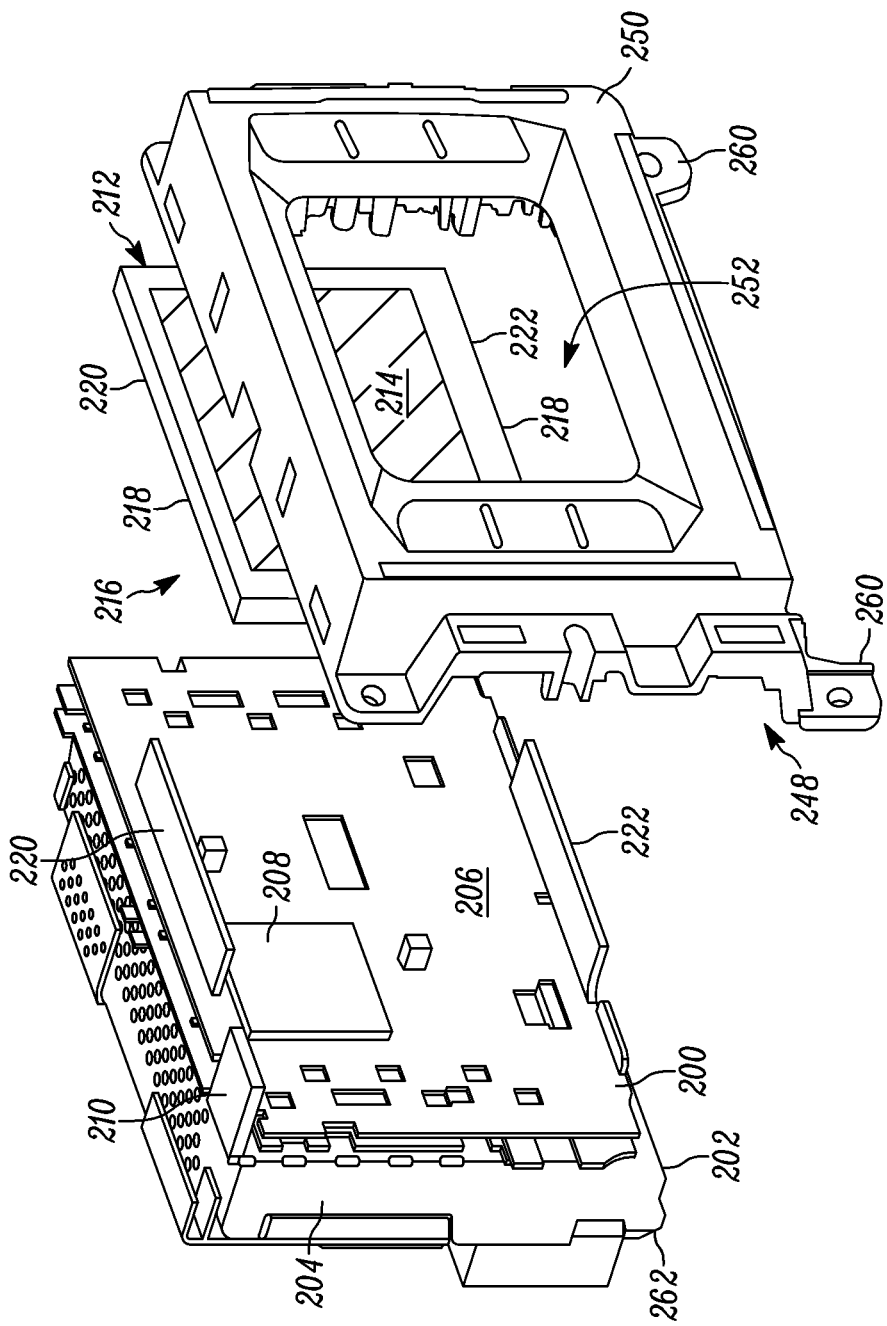
FIG. 2 is an exploded view of a faceplate attached to a head unit, the faceplate having a network access device and an antenna, a display screen removed from the faceplate and a bezel removed from the faceplate.

FIG. 2 is an exploded view of a faceplate 200, which is a circuit board. The faceplate 200 is configured to be attached to the front side 202 of a head unit 204 and thus outside the head unit 204 and sheet metal panels from which a prior art head unit is typically constructed.

The front side 206 of the faceplate 200 supports and provides electrical connections between a network access device 208, an antenna 210, also attached to and supported by the faceplate 200, and a display screen 212 that provides a user interface. The electrical connections provided by the faceplate 200 are embodied as electrically-conductive circuit board "traces" well known to those of ordinary skill in the electronic art.

Attaching the network access device 208 and its antenna 210 to the front side 206 of the faceplate 200 as shown in FIG. 2 instead of inside the head unit 204 as shown in FIG. 1, facilitates replacement, upgrade and/or repair those two devices and other devices on the faceplate 200 simply by removing a display screen and bezel described below. In a preferred embodiment, the network access device 208 is not soldered to the faceplate 200 but is preferably attached to the faceplate 200 using conventional plug-in connectors well known in the art. Using connectors thus enables the network access device 208 to be removed by itself, without removing the faceplate 200 and without requiring special tools and without damaging either the faceplate 200 or the network access device 208. The network access device 208 is thus considered to be "removably attached" to the faceplate 200 when it is attached to the faceplate 200 using a connector.

The display screen 212 is preferably a conventional touch-sensitive liquid crystal display panel, well known to those of ordinary skill in the electronic art. It has a front side 214 that faces into a vehicle passenger compartment and a rear side 216, not visible in FIG. 2, which is electrically and mechanically attached to conventional connectors (not visible) located on the front side 202 of the head unit 204.

In a preferred embodiment, the display screen 212 has electrical contacts 218 on its top edge 220 and/or its bottom edge 222. The contacts 218 are configured to be received into, and make electrical connection with, mating connectors 220, 222 that are attached to and which extend outwardly from the front side 206 of the faceplate 200. The display screen 212 is thus snapped in place, mechanically connecting it to the faceplate 200 and electrically connecting it to the network access device 208 through the contacts 218 on the display screen 212 and the connectors 220, 222 on the faceplate 200. The display screen 212 is thus considered to be "removably attached" to the faceplate.

The network access device 208 is typically embodied as a radio frequency transceiver configured to provide both voice and data communications between a vehicle, its occupants and persons or entities at remote locations by way of a conventional cellular telephone network, not shown. The two-way radio frequency communications are enabled by the antenna 230, which is mechanically attached to the faceplate 200 such that the antenna 230 extends outwardly from the front side 206 of the faceplate 200 and into a recess formed into the back side 248 of the bezel 250.

The antenna 230 is preferably embodied as a ceramic "patch" antenna, well known to those of ordinary skill in the cellular communications art. It is electrically connected to the network access device 208 by conventional electrical circuit board traces or conductors that are on one or both sides of the faceplate 200 but which are not visible in FIG. 2 because of their narrow widths. The antenna 230 can be either soldered or attached using conventional connectors, in which case the antenna 230 is "removably attached" to the faceplate 200.

Still referring to FIG. 2, the bezel 250 is made of plastic. Radio frequency signals readily pass through the bezel 250 obviating the need for a separate vehicle antenna for the network access device 208, obviating the need for antenna connectors through a metal box and obviating the need for a coaxial cable between the antenna and network access device.

The bezel 250 is sized, shaped and arranged to be "removably attached" to at least one of the head unit 204, a dashboard not shown in FIG. 2, or the faceplate 200. The bezel 250 has a large, substantially rectangular "window" or opening 252 through which the display screen 212 can be seen and touched when the display screen 212 is attached to the faceplate 200 and the bezel 250 attached to the head unit 204.

The back side 248 of the bezel 250 is provided with recesses or pockets, not visible in FIG. 2, which are sized, shaped and arranged to receive the connectors 220, 222, antenna 210 and the protrusion of the network access device 208 above the front side 206 of the faceplate 200. The bezel 250 is thus able to fit over devices that extend away from the front side 206 of the faceplate 200.

The bezel 250 and head unit 204 are provided with complementary snap-together connective devices 260, 262 which are referred to herein as latches and detents. As used herein, "detent" refers to a device such as a notch, slot or spring-operated ball, that positions and holds the bezel 250 in place against the front side 206 of the faceplate 200 such that the bezel 250 e can be released by force applied to the bezel. A latch is a mechanical device that engages a notch, slot or receives a spring-operated ball.

Figure 3:
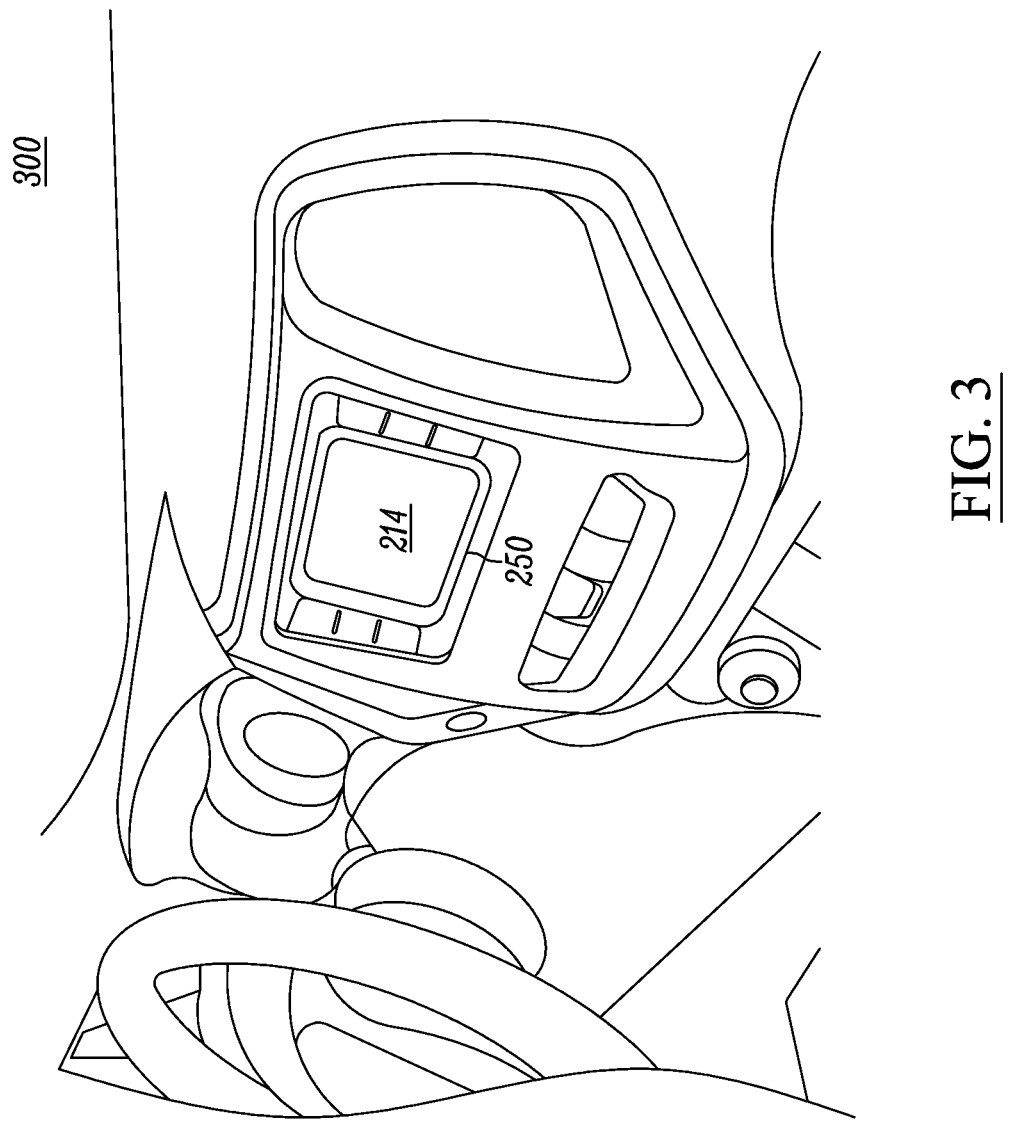
FIG. 3 is a perspective view of an assembled faceplate, display screen and bezel installed into a dashboard of a motor vehicle.

FIG. 3 is a perspective view of a vehicle dashboard 300. Mounted into the dashboard 300 and concealed from view is a head unit for a vehicle infotainment system. Also not visible is a faceplate as shown in FIG. 2. A display screen 214 and bezel 250, however, are visible. A network access device and an associated antenna attached to the faceplate are concealed by the bezel 250 but nevertheless readily accessible simply by removing the bezel 250. An external and visible antenna is required to operate the network access device.

Figure 4:
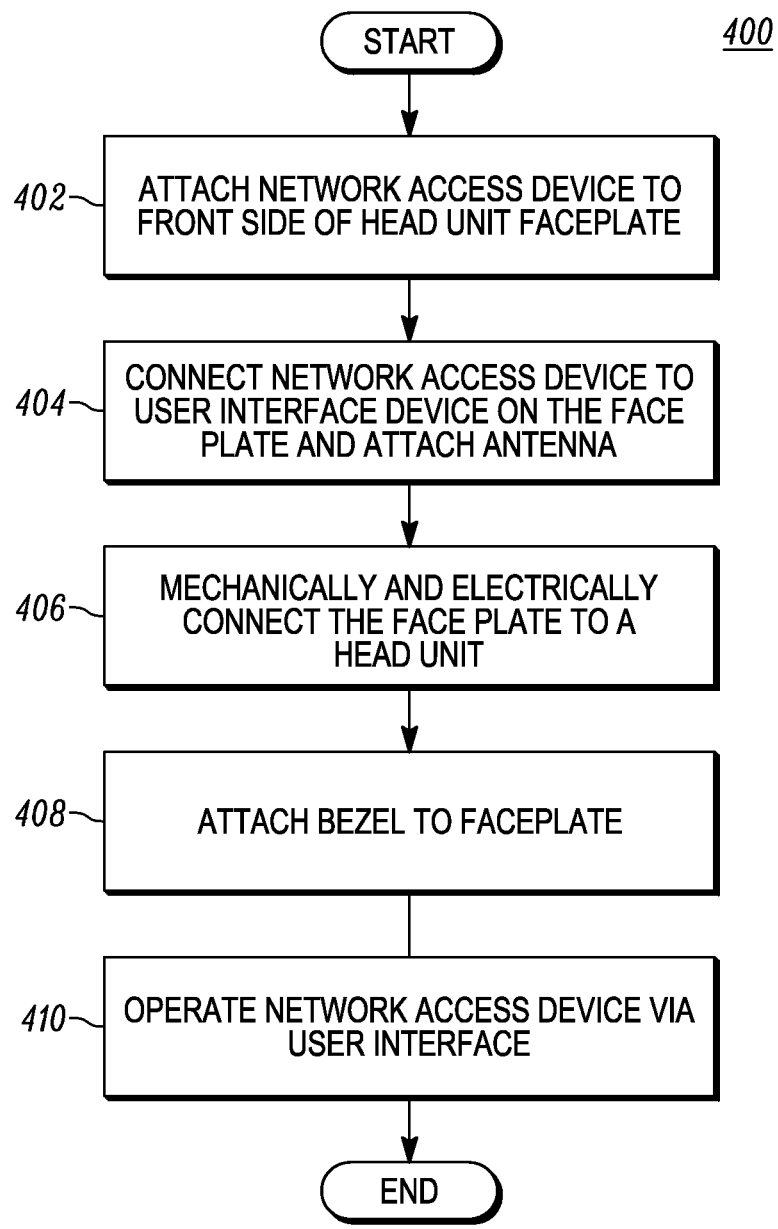
FIG. 4 depicts steps of a method by which a network access device is coupled to the head unit of a motor vehicle's information/entertainment system.

Finally, FIG. 4 depicts steps of a method 400 for coupling a network access device to an infotainment system head unit without locating the network access device inside the head unit itself but locating it instead outside the head unit.

At step 402, a network access device as described above is attached to snap-in connectors that are provided to a front side of a head unit faceplate. After the network access device is attached to the faceplate, at step 404, a user interface, such as the touch-sensitive screen described above, is attached to different connectors that are attached to the same faceplate. At step 406, the faceplate carrying the network access device and user interface are mechanically and electrically coupled to a head unit as described above. After the faceplate is attached to the head unit, a decorative bezel is attached over the faceplate at step 408. At step 410, the external-to-the-head unit network access device located on the faceplate is thereafter operated with the user interface in the same way that a prior art network access device inside the head unit is operated.

In alternate embodiments, a network access device can be permanently soldered to a faceplate. Similarly, a display screen can be permanently soldered to the faceplate as can the antenna. Soldering components to a faceplate or any circuit board makes their removal so costly as to be impractical and essentially not feasible.

Those of ordinary skill in the art will recognize that locating a network access device as well as its antenna on a faceplate that is covered by a removable bezel facilitates the replacement and/or repair of such devices. Those of ordinary skill in the art will also recognize that locating a network access device and its associated antenna outside of a metal box and instead on the front side of a faceplate and behind a plastic bezel will obviate the need for a separate antenna, connector and coaxial cable because of the improved RF "visibility" of the antenna behind-the-bezel antenna to network signals.

The foregoing description is for purposes of illustration only. The true scope of the invention is set forth in the following claims.

What is claimed is:

1. Apparatus comprising:
   a faceplate circuit board;
   a front side of the faceplate circuit board configured to face into a vehicle passenger compartment;
   a rear side of the faceplate circuit board configured to be attached to a vehicle entertainment system head unit that is installed further into a vehicle dashboard than the faceplate circuit board;

a network access device attached to the front side of the faceplate circuit board, the network access device being configured to be able to provide two-way wireless communications;

an antenna attached to the front side of the faceplate circuit board, the antenna being electrically coupled to the network access device via an electrical conductor on the faceplate circuit board and concealed by a bezel, the bezel being configured to allow radio frequency signals to readily pass through the bezel such that neither an external antenna nor an external-antenna connector are needed; and a display screen attached to the front side of the faceplate circuit board and electrically coupled to the network access device via electrical conductors on the faceplate circuit board, the display screen providing a user interface for the network access.

2. The apparatus of claim 1, wherein the network access device is removably attached to the faceplate circuit board.

3. The apparatus of claim 2, wherein the network access device is removably attached to the faceplate circuit board via plug-in connectors.

4. The apparatus of claim 1, further comprising a removably-attached bezel configured to conceal the network access device and enable access to the display screen.

5. The apparatus of claim 1, wherein the network access device comprises a cellular telephone transceiver and wherein the display screen comprises a touch-sensitive display screen that provides a user interface for the cellular telephone transceiver and a user interface for the vehicle entertainment system.

6. The apparatus of claim 1, wherein the antenna is a ceramic patch antenna, configured to extend away from the front side of the faceplate circuit board.

7. The apparatus of claim 1, further comprising a latch configured to engage a detent coupled to at least one of the head unit and the vehicle, wherein engagement of the detent by the latch removably affixes the faceplate circuit board.

8. The apparatus of claim 1, further comprising a detent configured to engage a latch coupled to the head unit, wherein engagement of the detent by the latch removably affixes the faceplate circuit board.

9. A method of coupling a network access device to a head unit of a motor vehicle, the head unit being configured to receive and be controlled from a user interface that is attached to a faceplate circuit board that is attached to the head unit, the faceplate circuit board having a front side that faces into the motor vehicle passenger compartment and a rear side that faces the head unit, the method comprising:

mechanically attaching a network access device to the front side of the faceplate circuit board;

electrically coupling the network access device to the user interface on the faceplate circuit board via electrical conductors on the faceplate circuit board;

mechanically and electrically connecting the faceplate circuit board, with the network access device and user interface, to the head unit, the head unit being configured to be installed further into a vehicle dashboard than the faceplate circuit board;

mechanically attaching an antenna to the front side of the faceplate circuit board and electrically coupling the antenna to the network access device via electrical conductors on the faceplate circuit board, the antenna projecting away from the faceplate circuit board and into a space formed in a back side of a bezel, the bezel being configured to avow radio frequency signals to readily pass through the bezel such that neither an external antenna nor an external-antenna connector are needed; and operating the network access device using a touch-sensitive display screen.

10. The method of claim 9, further comprising the steps of removably attaching a bezel to the head unit and concealing the network access device behind the bezel.

11. The method of claim 9, wherein the user interface is a touch-sensitive display screen.

12. The method of claim 1-11, wherein the antenna is a ceramic patch antenna, configured to extend away from the front side of the faceplate circuit board and into a space formed in a back size of the bezel.

13. The method of claim 9, wherein the head unit comprises a latch configured to engage a detent on the faceplate circuit board, wherein engagement of the detent by the latch removably affixes the faceplate circuit board with the network access device and antenna to the head unit and electrically connects the network access device to the head unit.

14. The method of claim 9, wherein the head unit comprises a detent configured to engage a latch on the faceplate circuit board, wherein engagement of the detent by the latch removably affixes the faceplate circuit board with the network access device and antenna to the head unit and electrically connects the network access device to the head unit.

* * * * *